Oct. 16, 1934.  J. F. ROBB ET AL  1,977,014
REVERSIBLE FIFTH WHEEL CONSTRUCTION
Filed Oct. 3, 1933    2 Sheets-Sheet 1

Inventors
JOHN F. ROBB.
CHARLES H. WAGNER.
By
Attorneys

Oct. 16, 1934.  J. F. ROBB ET AL  1,977,014
REVERSIBLE FIFTH WHEEL CONSTRUCTION
Filed Oct. 3, 1933  2 Sheets-Sheet 2
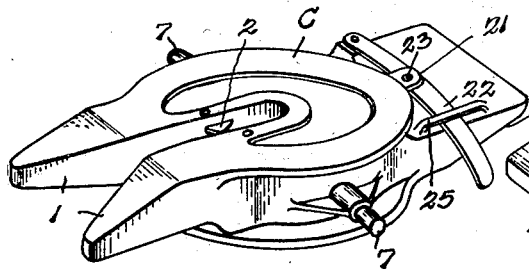
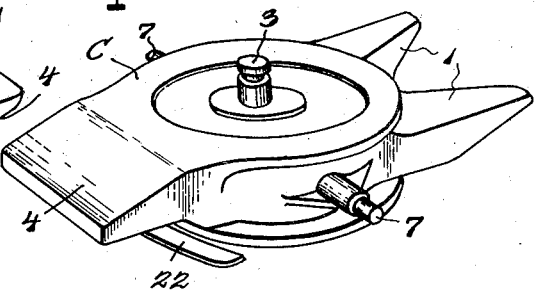
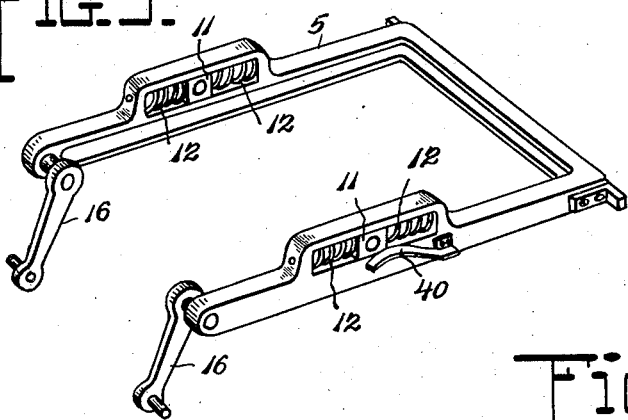
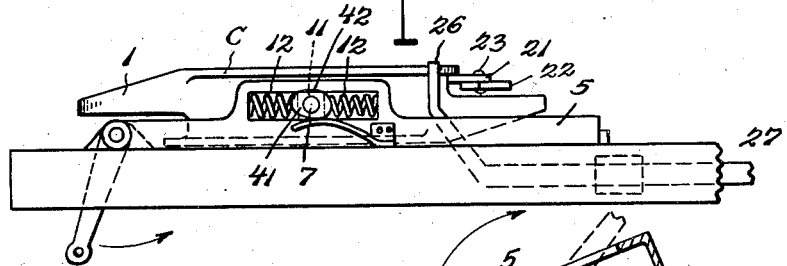
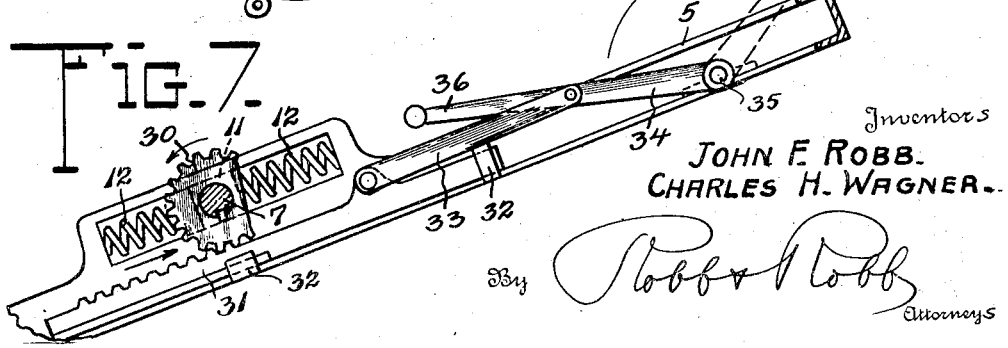
Inventors
JOHN F. ROBB.
CHARLES H. WAGNER.

UNITED STATES PATENT OFFICE 1,977,014

REVERSIBLE FIFTH WHEEL CONSTRUCTION

John F. Robb, Cleveland Heights, Ohio, and Charles H. Wagner, Washington, D. C., assignors to Highway Trailer Company, Edgerton, Wis., a corporation Application October 3, 1933, Serial No. 691,992

14 Claims. (Cl. 280—33.1)

This invention relates to a novel fifth wheel construction adapted for use in connection with tractor-trailer combination vehicles for coupling the same in articulated relation.

In highway transportation systems, a motor propelled tractor vehicle is employed to draw one or more trailers and the set-up is such that the trailer ordinarily is equipped with two transport wheels at its rear end, and a fifth wheel coupling part at its front end for cooperation with a mating coupling part carried by the tractor. These coupling parts are intended to become interlocked upon cooperation so that the trailer can be drawn along with the tractor. Ordinarily, one of the vehicles is provided with a king pin coupling part for engagement with a female coupling part on the other vehicle which includes locking dogs for embracing and securing the king pin against release when the two parts are in cooperation.

Since there are several types of fifth wheels on the market, some manufacturers deem it advantageous to associate the king pin part with the tractor, whereas other constructions embody the use of the king pin with the trailer. Conversely, some constructions employ the female part on the trailer and others employ the female part on the tractor. Accordingly, the utility of a tractor mounting only one type of coupling instrumentality is considerably reduced since it is not universally adapted to make connections with trailer vehicles mounting a corresponding coupling instrumentality.

In order to permit the coupling of a tractor to trailers having different types of coupling instrumentalities, or specifically, male or female types of fifth wheel coupling, it is desirable that the fifth wheel of the tractor vehicle include parts such that one or the other will mate with the coupling instrumentality on the trailer and can be used alternately to make the proper connection.

With the foregoing in mind, we have contemplated the provision of a novel type of fifth wheel which may be mounted either on a tractor or a trailer and which includes a male coupling instrumentality and female coupling instrumentalities which may be presented alternatively to the coupling devices on the other vehicle. In other words, we provide a novel fifth wheel assembly and also a mounting therefor, which will allow the fifth wheel to be inverted to bring one coupling instrumentality into operative position or to be swung to another position to bring the other coupling instrumentality into operative position.

It may be said that one object of this invention is to provide a coupling unit which will render the vehicle with which it is equipped, suitable for coupling relation with either a female or male coupling device upon the other vehicle with which it is to be connected.

Other objects and advantageous features of this invention will further be observed from the following detailed description and accompanying drawings, wherein like characters of reference designate like parts, and wherein—

Figure 3 is a detail in perspective of our novel fifth wheel construction with the female side in operative position.

Figure 4 is a detail in perspective of the fifth wheel construction of Figure 3 in inverted position and showing the male coupling side.

Figure 5 is a perspective view of the mounting for the novel fifth wheel and wherein a modified cushion spring arrangement is shown for the fifth wheel trunnions.

Figure 6 is an elevational detail of the tractor frame and fifth wheel unit disclosing particularly the nature and arrangement of the instrumentalities for operating the locking mechanism of the fifth wheel assembly.

Figure 7 is a fragmentary view showing the details of construction of a fifth wheel assembly such as that proposed, that may be positively rotated in its mounting through rack and pinion mechanism.

Figure 1:
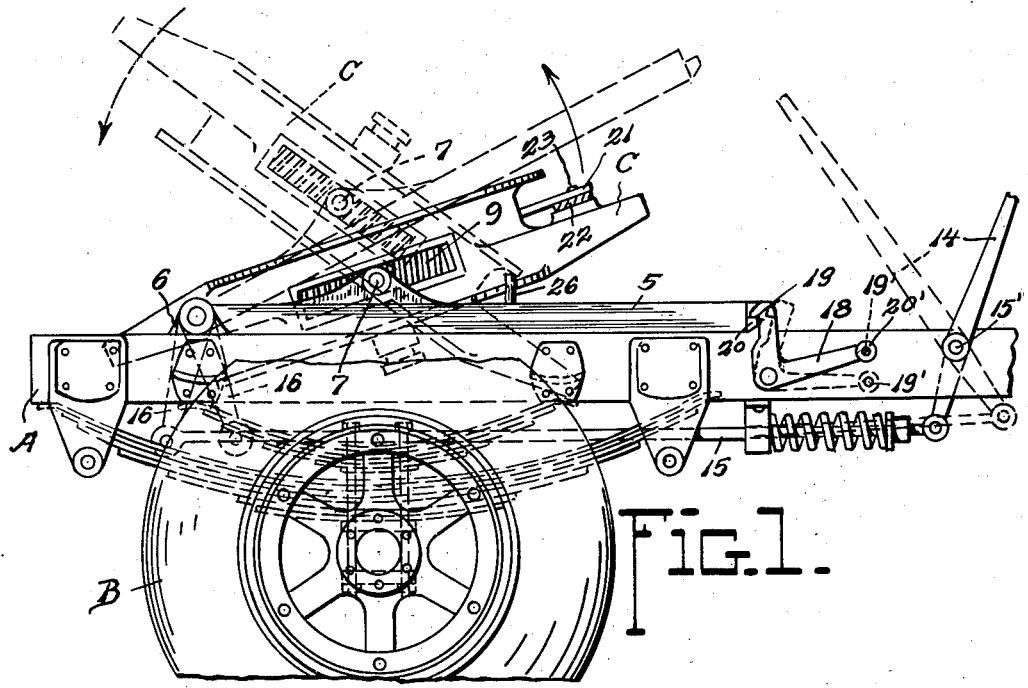
Figure 1 is a side elevation of the rear end of the vehicle disclosing our novel coupling device and mounting therefor associated with the vehicle frame along with instrumentalities for operating the mounting and coupling devices.

With reference to the drawings, the reference character A designates the rear portion of the vehicle frame, preferably, for purposes of illustration, the rear section of a tractor chassis having supporting wheels B. The chassis is intended to support our novel fifth wheel construction with which is associated a novel means for mounting the said construction so that it may, as a whole, be rotated about a transverse axis to bring the female or the male parts of the coupling unit into a position where one or the other may cooperate with mating coupling instrumentalities on another vehicle.

Figure 2:
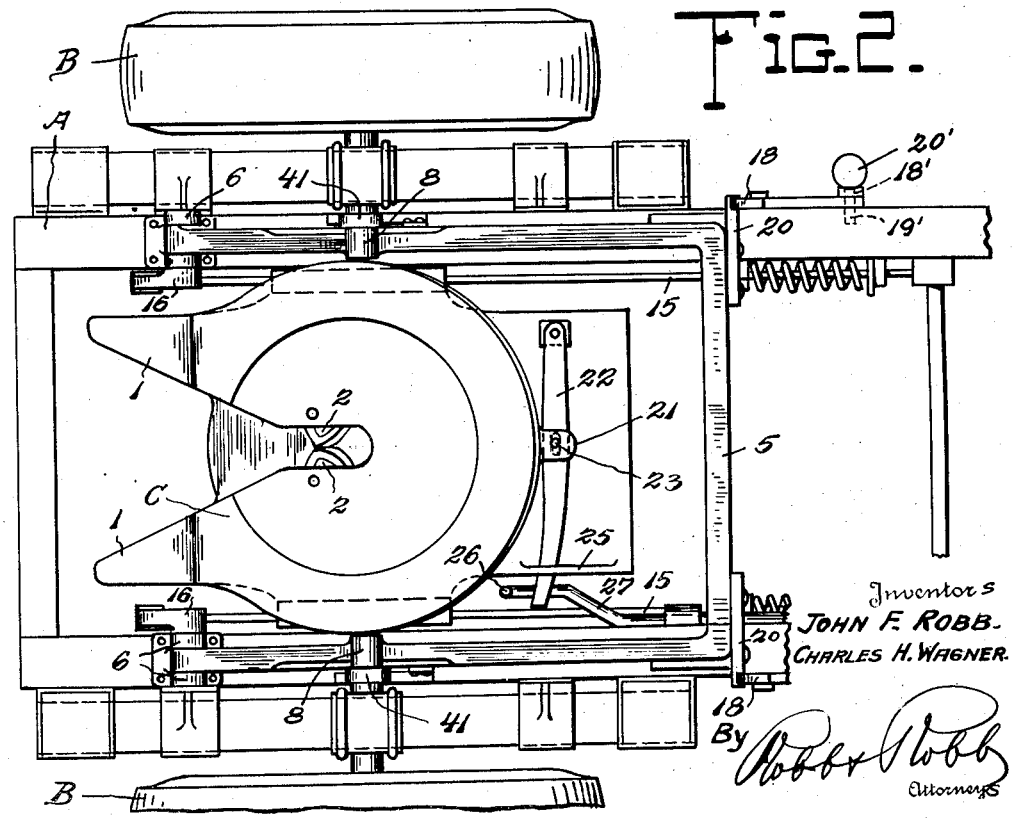
Figure 2 is a top plan view of Figure 1.

The fifth wheel which is indicated by C includes a female part of a known type such as shown in the Martin and Farr United States Letters Patent No. 1,412,025, this known type embodying what is called a split fifth wheel construction wherein the body is provided with rearwardly extending guides 1 that define a channel through which a king pin or male coupling travels into cooperative engagement with locking dogs 2 located at the apex of the slot as observed in Figure 2.

In carrying out our invention, we propose to construct a coupling unit wherein one half the assembly provides a female coupling part and the other half of the assembly provides a male coupling unit, arranged in back to back relation so that upon rotation in a vertical plane, first one unit may be presented in operative position and then the other.

We have already pointed out the female part of the construction, and reference may be had to Figure 4 which best discloses the male portion which includes the king pin 3, and inclined surface 4 upon which the female part of the mating fifth wheel assembly rides into cooperative engagement with the king pin. It will be observed then that this novel coupling unit embraces a male and female coupling arrangement arranged in back to back relation, or, in other words, one arrangement is superimposed upon the other.

In mounting this arrangement on the vehicle, we have provided a novel type of yoke frame which will permit the fifth wheel construction to be lifted as a unit above the chassis of the vehicle to a degree where, upon rotation of the unit, no interference occurs with the vehicle frame or other parts which would prevent the selective positioning of the coupling instrumentalities for cooperation with the mating coupling instrumentalities of the second vehicle. To this end we have provided a yoke frame identified by the reference character 5, which is substantially U-shaped as shown in Figure 5, the legs of the U at their lower ends being journaled in bearing members 6 attached to and transversely aligned across the frame. Accordingly, the U-frame may be lifted at its closed end in an arcuate plane, as indicated in Figure 1, to raise the fifth wheel unit as shown.

The fifth wheel construction is supported on the yoke frame through trunnions 7, Figures 3 and 4, that are located in bearings 8 formed as a part of the yoke frame, in one construction, as disclosed in Figure 1, which form pivots about which the fifth wheel construction may be rotated. The fifth wheel construction is afforded a resilient mounting through the use of coil springs 9 located on each side of the trunnions 7 which float with respect to the fifth wheel assembly, the springs being located in suitable rectangular pockets 9' formed in the side of the fifth wheel. However, as disclosed in Figure 5, the arrangement may be reversed and the fifth wheel trunnions may be formed as a part of the fifth wheel as shown in Figures 3 and 4, and the bearings therefor, as indicated at 11, may be floatingly mounted in guides 7' in the yoke frame and opposed by oppositely acting coil springs 12. The purpose of the construction as mentioned is to cushion the fifth wheel construction against shocks, etc.

It is apparent, then, that through the lifting of the U-frame, it is possible to pivot the fifth wheel construction about its axis on the U-frame so that one fifth wheel coupling instrumentality or the other may be selectively positioned for cooperation with a mating coupling instrumentality on another vehicle.

It is to be appreciated that these fifth wheel constructions are quite heavy and we have provided instrumentalities for offering the mechanical advantage necessary to manually raise the U-frame and fifth wheel to a position where the fifth wheel may be inverted as aforesaid. This mechanism is disclosed in Figure 1 as comprising a lifting lever 14 pivoted on the frame of the vehicle and attached at its lower end to a draw rod 15 which is connected to a lever 16, see Figure 2. Lever 14 is mounted on a cross rod 15' journaled in the vehicle frame which carries a similar lever on its other end having also a draw rod connected thereto. The upper end of the lever 16 carries the bearing pin of the bearing 6, Figure 5, which is keyed to the U-frame bearings, but is rotatable in the vehicle frame bearings so that the lever 16 serves as a crank to rotate the bearing pin and lift the U-frame upon proper actuation of either of the lifting levers 14. A balancing spring 17 encompasses the draw rods 15 for a purpose which will be readily apparent.

A yoke lock is also provided to retain the U-frame in its lower position as shown in Figure 1. This lock consists in a bell crank 18 pivoted on the frame and having one of its arms notched as at 19 for cooperation with an extension 20 formed as a part of the U-frame. A spring may be provided to bias the parts for locking position and preferably two of these devices are provided, one on each side of the frame as shown in Figure 2. The free end of each lever is tapped as at 18' to cooperate with openings 19' in the vehicle frame to receive a locking pin 20', primarily to prevent accidental release of the lock. This arrangement of course prevents the U-frame from lifting as the load is taken on the coupling instrumentalities.

As hereinbefore mentioned, the female section of the fifth wheel assembly includes locking dogs, which, as, disclosed in the Martin and Farr patent supra, are operated by means of an instrumentality such as that disclosed at 21 in Figure 2. In the present arrangement, to afford the proper operation of these dogs we have provided a novel arrangement of instrumentalities which come into cooperation incident to the movement of the female part of the fifth wheel assembly to operative position. These instrumentalities include a lever 22 which has a pivotal mounting on the underside of the portion 4 of the male coupling member and which is pivotally attached as at 23 to the lever 21, the end of which extends through a guide 25 and lies in a zone traversed by the upstanding end 26, Figures 2 and 6, of a draw rod 27 which is mounted in suitable guides on the frame and provided with an actuating lever, not shown. It is obvious that with the draw rod in its forward position as in Figure 2, the U-frame may be raised and the fifth wheel inverted and then lowered without interference between the parts 22 and 27. However, by pulling the release rod 27 forwardly, the upstanding end 26 engages the lever 22 and in this way effects the operation of the locking dogs 2 to open the same and permit the release of the king pin.

We have also provided a mechanical means for inverting the novel fifth wheel construction which is best shown in Figure 7 and which includes a pinion 30 keyed to the trunnion which meshes with a rack 31 mounted in guides 32 on the legs of the U-frame. Attached to the rack is a lever system for reciprocating the same which includes a member 33 pivoted centrally to a member 34 which in turn is pivoted on the frame as at 35. As the end 36 of the lever 34 is lifted, the rack is reciprocated, which effects the rotation of the pinions 30, whereupon rotation of the fifth wheel construction about its axis on the U-frame is obtained. This system however, is freely floating, so as not to interfere with the normal working the fifth wheel part when coupled to a mating part and it may also be pointed out that this arrangement for tilting the fifth wheel is useful in moving the unit to its proper degree of angularity for co-operating with a mating coupling on another vehicle. For instance, when the female part of the novel coupling unit herein disclosed is presented for cooperation with the male part of another vehicle, it usually assumes an angular position with the rearward end thereof tilted downwardly toward the ground.

In the other designs of fifth wheel unit shown herein, we have provided other means holding the fifth wheel in the correct position for coupling; that is, when the female part is presented, it assumes the angular position aforementioned, but when the male part is presented it ordinarily assumes the position shown in Figure 4. It will be observed in Figure 5 that there is a leaf spring 40 mounted on one of the legs of the U-frame that has the free end thereof adjacent the opening in the trunnion bearing 11. This leaf spring is intended to engage with a cam member 41 having cam faces 42, the cam being demountably attached to the trunnion end. Although we have shown only one cam and leaf spring, it is obvious that the same could be employed for both sides of the fifth wheel unit. The end which this element subserves is chiefly that of offering means for holding the fifth wheel in certain positions of adjustment as before outlined, yet with a force which is practically negligible so far as normal working of the fifth wheel parts when coupled with those of another vehicle is concerned. By working we mean the movement of the fifth wheel about its axis to accommodate uneven places in the road, etc., as would naturally occur between vehicles so articulated. As mentioned, the pressure upon the cam as exerted by the leaf spring is sufficient to hold the fifth wheel in any one of a number of angular positions when it is free.

An advantageous feature of this invention resides in the fact that through its use a tractor may be coupled to a trailer vehicle mounting either a male or female type coupling simply by raising the U-frame and inverting the fifth wheel to bring up the proper mating coupling.

Having thus described our invention, what we claim as new and desire to secure by Letters Patent of the United States, is

1. In combination with a vehicle, a coupling unit including a plurality of superimposed coupling parts, and means whereby said unit may be inverted to bring one or the other of the coupling parts into coupling position.

2. In combination with a vehicle, a coupling unit mounted thereon and including a plurality of alternatively usable coaxially positioned coupling instrumentalities, mounting means for said coupling unit, said means being of such a nature that the said coupling unit may be inverted to selectively and successively bring one and then another of the coupling instrumentalities into a position for use.

3. In combination with a vehicle, a coupling unit mounted thereon and including a plurality of alternately usable superimposed coupling instrumentalities, means for rotatably mounting said coupling unit on said vehicle, whereby said coupling unit can be inverted to bring one or the other of the coupling parts into a position for use.

4. In combination with a vehicle, a coupling unit carried by said vehicle, and including a king pin mounted on one side of the unit, and a female locking assembly including movable locking dogs and the usual king pin slot on the other side of the unit, mounting means for said coupling unit whereby said unit may be rotated to bring said king pin into a position for use or to a position where said female coupling assembly is presented for use, and means for operating the locking dogs of said female assembly which includes instrumentalities carried by the coupling unit, and instrumentalities on said vehicle adapted to be placed in cooperative relation with said first mentioned instrumentalities when said coupling unit is in one position of adjustment.

5. In combination with a vehicle, a coupling device and a mounting for said coupling device, said coupling device including male and female coupling instrumentalities spaced one from the other, said mounting means including a frame for supporting said coupling unit and in which said coupling unit is rotatable, and means for rotatably mounting said frame on said vehicle.

6. In combination with a vehicle, a coupling unit and a mounting therefor, said coupling unit including male and female parts, said mounting including a frame on which said coupling unit is mounted and in which said coupling unit is rotatable to present one or the other of the coupling instrumentalities into a position for use, and means for mounting said frame on said vehicle whereby said frame may be lifted to permit rotation of said coupling unit.

7. In combination with a vehicle, a fifth wheel thereon for cooperation with another vehicle to support and couple the latter, and a mounting for said fifth wheel whereby said fifth wheel may be inverted.

8. In combination with a vehicle, a unitary fifth wheel thereon embodying coupling instrumentalities of respectively different types for cooperation with another vehicle to support and couple the latter, mounting means for said fifth wheel, said means being pivotally connected to said vehicle whereby said fifth wheel coupling instrumentalities may be respectively shifted from an operative to an inoperative coupling position.

9. In combination with a vehicle, a fifth wheel, said fifth wheel including male and female coupling instrumentalities, means for mounting said fifth wheel on said vehicle, said means comprising a frame pivotally associated with said vehicle and with said fifth wheel and in which said fifth wheel is rotatable to present one or the other of the coupling instrumentalities into a position for use, and means for rotating said frame about its pivotal connection with said vehicle to permit such rotation of the fifth wheel therein, said means including a manually operative lever mounted on said frame, and instrumentalities associated with said lever and with said frame.

10. In combination with a vehicle, a fifth wheel, said fifth wheel including a female coupling instrumentality having locking dogs, means for mounting said fifth wheel on said vehicle, said means being pivotally associated with said vehicle and with said fifth wheel, whereby said fifth wheel can be inverted, and means for operating the locking dogs of said fifth wheel, comprising instrumentalities associated with the fifth wheel and instrumentalities mounted on the frame of the vehicle, said instrumentalities being adapted to cooperate when said fifth wheel is in one position of adjustment and to be separated when the fifth wheel is in another position of adjustment, cooperation between said instrumentalities being established incident to movement of the fifth wheel to one of its positions of adjustment.

11. In combination with a vehicle, a fifth wheel assembly, which includes male and female coupling instrumentalities arranged in back to back relation, trunnions on said fifth wheel, means for mounting said fifth wheel on said vehicle comprising a frame having bearings for the reception of said trunnions, and means for rotating said fifth wheel in said frame comprising a pinion keyed to one of said trunnions, a rack engaging said pinion, and means for actuating said rack to rotate said pinion and said fifth wheel whereby said coupling instrumentalities may be moved into or out of their respectively operative positions.

12. In combination with a vehicle, a coupling unit mounted on said vehicle which comprises, in combination, a male and a female coupling instrumentality mounted in back to back relation, supporting means for said coupling unit, comprising a frame on said vehicle wherein said coupling unit is rotatable, and means for offering resistance to such rotation.

13. In combination with a vehicle, a coupling unit mounted on said vehicle which comprises, in combination, a male and female coupling instrumentality mounted in back to back relation, supporting means for said coupling unit, comprising a frame on said vehicle wherein said coupling unit is rotatable, and means for offering resistance to such rotation, said means including a leaf spring mounted on said frame, and a cam member carried by said coupling unit.

14. In combination with a vehicle, a coupling unit including male coupling instrumentalities and female coupling instrumentalities arranged in back-to-back relation, and means for supporting said coupling unit whereby said unit may be turned upside-down to bring one or the other of the coupling instrumentalities into a position for use.

JOHN F. ROBB.
CHARLES H. WAGNER.